United States Patent [19]

Grunst

[11] Patent Number: 4,471,930
[45] Date of Patent: Sep. 18, 1984

[54] DEVICE FOR MOUNTING ELECTRICAL DEVICES ON A PLATE

[75] Inventor: Heinz Grunst, Marienheide, Fed. Rep. of Germany

[73] Assignee: Starkstrom Gummersbach GmbH, Marienheide, Fed. Rep. of Germany

[21] Appl. No.: 278,975

[22] Filed: Jun. 29, 1981

[30] Foreign Application Priority Data

Jul. 4, 1980 [DE] Fed. Rep. of Germany ....... 3025330

[51] Int. Cl.³ .............................................. G12B 5/00
[52] U.S. Cl. ................... 248/27.1; 248/412; 248/245
[58] Field of Search ............... 248/27.1, 201, 295.1, 248/297.1, 125, 245, 412; 403/104, 110, 320, 370, 372

[56] References Cited

U.S. PATENT DOCUMENTS

| | | | |
|---|---|---|---|
| 561,779 | 6/1896 | Feeley | 248/412 |
| 2,518,936 | 8/1950 | Roberts | 248/27.1 |
| 2,980,756 | 4/1961 | Kelleher | 248/27.1 |
| 3,231,225 | 1/1966 | Bakke | 248/27.1 |
| 3,710,096 | 1/1973 | McFarlin | 248/27.1 |
| 3,744,612 | 7/1973 | Geis | 248/27.1 |
| 3,847,489 | 11/1974 | Van Riper | 248/245 |
| 4,338,036 | 7/1982 | Deleu | 403/370 |

Primary Examiner—Reinaldo P. Machado
Assistant Examiner—Alvin Chin-Shue
Attorney, Agent, or Firm—Collard, Roe & Galgano

[57] ABSTRACT

In devices for mounting electrical devices, in particular switch, command or signal devices on a plate, like a bottom plate of a switch box or an assembly plate of a switch box or switch board of the type with at least one mounting bar for the devices disposed parallel to the plate as well as with two vertically-extending supports mounted on the plate for each mounting bar and with screw connections between the supports and the mounting bar, the difficulty exists that it is hard to reach the screw connections between the supports and the mounting bars, because of tight space conditions due to a tight arrangement of the devices relative to each other and due to the wiring which leads to the devices. In order to be able to obtain a simple servicing and safe support of the mounting bars on the supports, even at the tightest space conditions, it is proposed to provide screws which are disposed vertically with respect to the plate and which cooperate with clamping plates which are so designed that by tightening the screws, the supports are rigidly connected with the mounting bar due to the clamping effect.

7 Claims, 5 Drawing Figures

DEVICE FOR MOUNTING ELECTRICAL DEVICES ON A PLATE

The invention relates to a device for mounting electrical devices, in particular switch, command or signal devices on a plate, such as a bottom plate of a switch box or an assembly plate of a switch box or switch board. More particularly, it relates to such a device having at least one mounting bar for the devices disposed parallel to the plate, as well as two vertically-extending supports mounted on the plate for each mounting bar and screw connections between the supports and the mounting bar.

In known devices of this type, the mounting bars are screwed at their ends directly into the supports. Consequently, the thread bores and screws are disposed normally with respect to the supports or parallel to the plate. Due to the tight adjacent disposition of the electrical devices on each mounting bar, the wiring which has to be provided leading to the devices and, consequently, the tight space conditions, it is very difficult and time consuming to screw the mounting bars on the supports in the practical application. It is also difficult to reach the screws, even with special tools.

It is an object of the invention to provide a device for mounting electrical devices of the aforementioned type which, even at the tightest space conditions, permits a simple servicing and secure mounting of the mounting bar on the supports.

This object of the invention is obtained in that the screws are disposed normally with respect to the plate and cooperate with clamping plates which are so designed that by tightening the screws, the supports are rigidly connected with the mounting bar due to the clamping effect.

Other objects and features of the present invention will become apparent from the following detailed description when taken in connection with the accompanying drawing which discloses several embodiments of the invention. It is to be understood that the drawing is designed for the purpose of illustration only and is not intended as a definition of the limits of the invention.

In the drawing, wherein similar reference characters denote similar elements throughout the several views.

Referring now in detail to the drawings, in the embodiments shown, a switch box is illustrated. However, it should be appreciated at the outset that the following described inventive device may also be used in switch cabinets, switch boards, switch desks, and the like.

Figure 1:
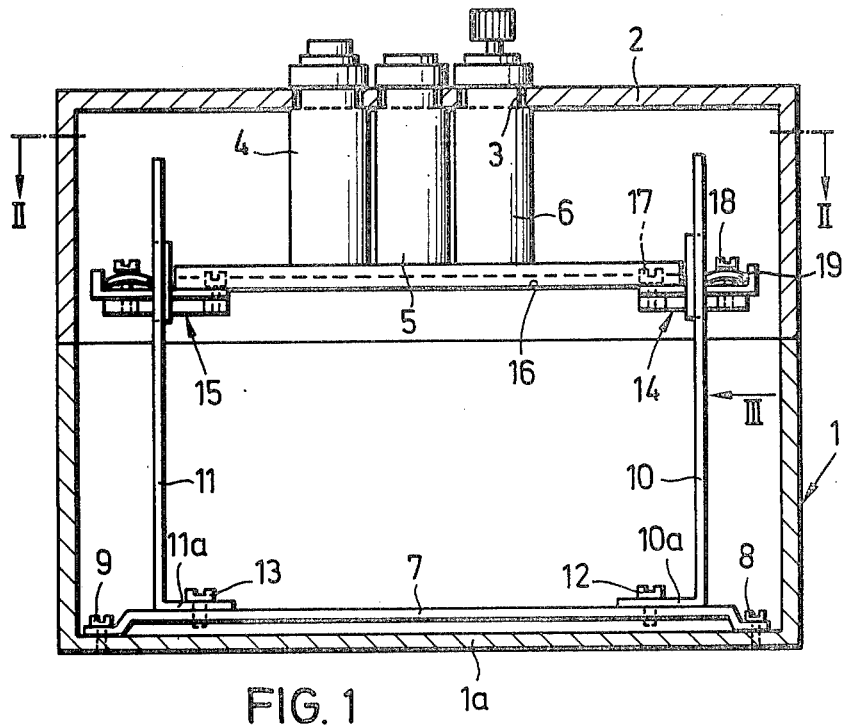
FIG. 1 is a vertical sectional view through a switch box embodying the present invention.
Figure 2:
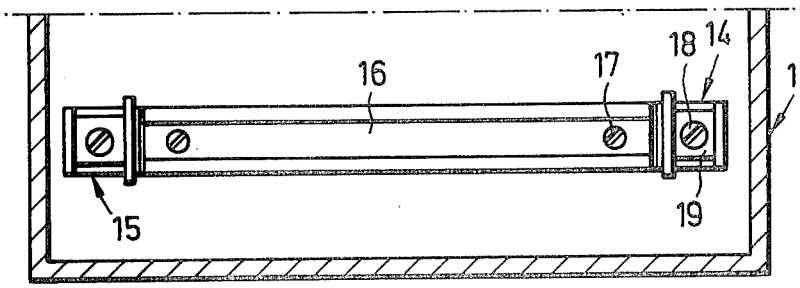
FIG. 2 is a partial cross-sectional view thereof taken in accordance with sectional line II—II of FIG. 1.

The switch box consists of a lower housing part 1 with a bottom plate 1a and a lid 2 which can be screwed onto the lower housing part with screws (not shown). The lid is provided with a row of bores 3 through which the electrical devices 4, 5 and 6 extend with their operating controls. FIG. 1 shows only three electrical devices 4, 5, and 6, however, any given number of electrical devices may be disposed in one row, dependent on the space conditions.

Two supports 10 and 11 are mounted on bottom plate 1a, if need be, by providing an intermediary support bar 7 which at its ends is connected with the bottom plate by means of screws 8, 9. Advantageously, the two supports 10, 11 consist of sturdy metal bars which at their lower ends are fixedly mounted with the assistance of a deflected part 10a and 11a by means of screws 12, 13. As previously mentioned, in addition to the two shown supports 10, 11, any given number of supports may be mounted in pairs on the bottom plate depending on the space conditions of the switch box. Each support pair supports one mounting bar 16 which advantageously is designed as an upwardly-opening, U-shaped bar. The electrical devices 4–6 are mounted on bar 16 in a known manner.

In accordance with the invention, mounting bar 16 is rigidly mounted on supports 10, 11 by screws 18 which are disposed normally with respect to bottom plate 1a and which cooperate with separate clamping plates 19. Clamping plates 19 are so designed that, when tightening screws 18, the supports are rigidly connected with the mounting bar due to the clamping effect. Preferably, each clamping plate 19 is an upwardly-arched spring plate, as shown best in FIG. 4.

In accordance with a further advantageous feature of the invention, each clamping plate 19 is provided with a bore 19a for inserting screw 18, whereby the bore is so dimensioned that a movement play or clearance for motion is provided. The clamping plate is mounted on an outwardly-extending arm 14a of a crosspiece 14.

Figure 3:
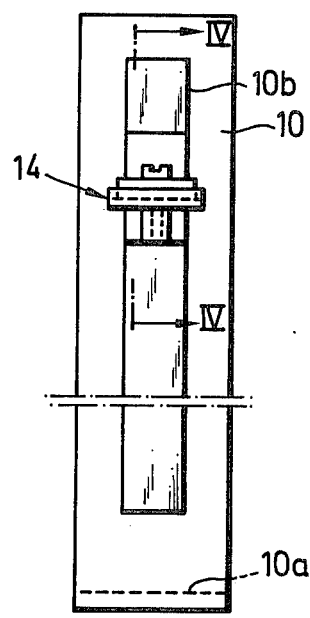
FIG. 3 is a fragmentarily-illustrated side view of a support taken in the direction of arrow III in FIG. 1.

In accordance with FIGS. 3 and 4, the right mounting end of mounting bar 16 with support 10 in accordance with FIG. 1 will be explained in the following; however, the same is true for the left mounting end with the crosspiece 15 which is homologous with respect to, or the mirror image of, crosspiece 14. The outwardly-extending arm 14a of crosspiece 14 is provided with a threaded bore 14g for screw 18. This arm 14a is provided with a deflected abutment bar 14b. As can be seen from FIG. 4, clamping piece 19 with its two oppositely-disposed edges engage, on the one hand, on abutment bar 14b and, on the other hand, on the outer face of support 10, when screw 18 is tightened. The inwardly-extending arm 14c of crosspiece 14 is connected with the end of mounting bar 16 by means of a screw 17.

The center part 14d of crosspiece 14 which extends parallel to plate 10 is guided in a longitudinal slot 10b of support 10. When screw 18 is at least partially unscrewed, whereby clamping plate 19 is further arched upwardly due to its inherent spring effect, the clamping effect is relaxed, so as to allow for a slight upward adjustment of crosspiece 14 together with mounting bar 16. It is to be understood that the width of clamping plate 19 is so chosen that it bridges slot 10b of the support and, as already mentioned, engages on the outer face of the support.

In accordance with a further embodiment of the invention, the arms 14a, 14c of crosspiece 14 are provided with reinforcement ribs 14e, 14f at the side facing plate 1a. The threaded bores 14g and 14h for screws 18 and 17, respectively, extend from arms 14a, 14c through these reinforcement ribs in a downward direction.

From the drawings, one can see the primary advantage of the inventive device, i.e., after removal of housing lid 2, screws 18, together with clamping plates 19, are freely accessible without any hindrance. In this manner, one can easily mount mounting bar 16 on supports 10, 11 and, if need be, perform a heightwise adjustment and finally tighten the screws again in case the screws should become loose after a lengthy transport of the factory-assembled switch box.

Figure 4:
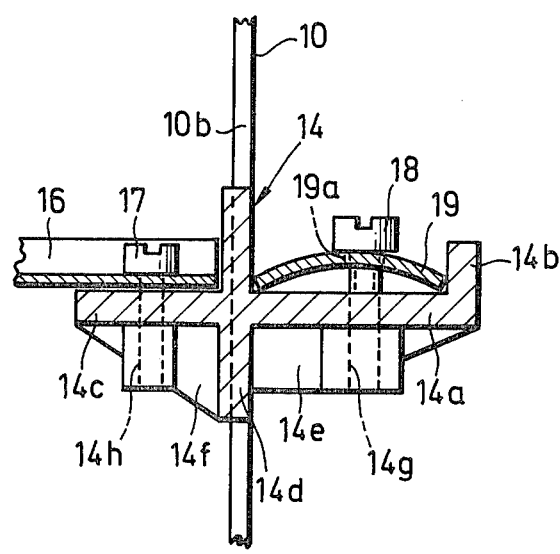
FIG. 4 is an enlarged, fragmentarily-illustrated sectional view taken in accordance with sectional line IV—IV of FIG. 3.
Figure 5:
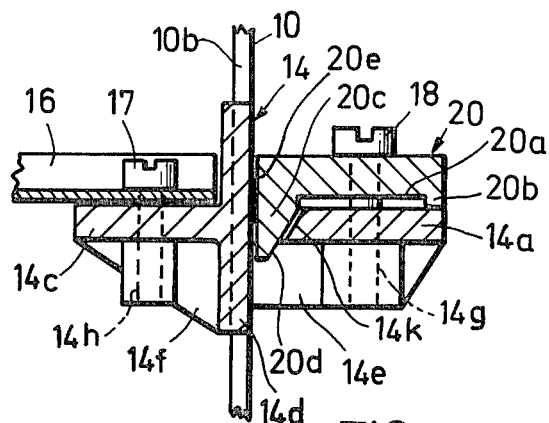
FIG. 5 is an enlarged, fragmentarily-illustrated sectional view corresponding to FIG. 4, but showing a different embodiment.

FIG. 5 shows another embodiment for obtaining the clamping effect which essentially is the same as that shown in FIG. 4. In this embodiment, a crosspiece 14 is again used, the arm 14a of which does not have an abutment bar 14b as in FIG. 4, but which extends outwardly at the same flat plane. However, a slot 14k with an angular face is provided in the center area of arm 14a in the proximity of center part 14d of crosspiece 14. An angle plate 20c of a massive-structured clamping plate 20 engages this slot 14k in such a manner that an angular face 20d of this angular plate engages in a clamping position on the corresponding angular face 14k. Thereafter, the engagement face 20e of the clamping plate 20 is pressed onto the center part 14d of crosspiece 14 by means of screws 18, also used in this embodiment.

In an advantageous embodiment, clamping plate 20 is provided with a support bar 20b which is mounted at the end away from angle plate 20c, whereby the support bar 20b is disposed vertically with respect to the drawing of FIG. 5. In this manner, a recessed section 20a is provided between this support bar 20b and angle plate 20c. In this manner, a very exact support of the clamping plate is assured in the clamping position.

Thus, while only several embodiments of the present invention have been shown and described, it will be obvious that many changes and modifications may be made thereunto, without departing from the spirit and scope of the invention.

What is claimed is:

1. A device for mounting electrical devices, comprising:
   a plate;
   at least one mounting bar for the devices disposed parallel to said plate;
   two supports mounted on said plate and disposed normally relative thereto for supporting said mounting bar; and
   screw connecting means for joining said supports and said mounting bar, said means including screws which are disposed normally relative to the plate and clamping plates with which said screws cooperate, wherein each clamping plate is provided with a bore for inserting a screw therethrough and wherein said screw connecting means additionally includes a pair of crosspieces for supporting the ends of said mounting bar, each of which comprises an outwardly-extending arm on which a clamping plate is supported, said arm being provided with a threaded bore for a screw and a deflected abutment bar which is positioned such that the clamping plate is supported, on the one hand, on this abutment and, on the other hand, on the outer face of one of said supports, when the screw is tightened.

2. The device according to claim 1, wherein said clamping plates comprise arched spring plates.

3. The device according to claim 1, wherein said crosspieces each have an inwardly-extending arm which is connected with one end of said mounting bar by means of a screw.

4. The device according to claim 1 or 3, wherein each of said crosspieces has a center part which extends normally with respect to said plate and wherein each of said supports has a longitudinal slot in which said center part is guided for a heightwise adjustment when the clamping plate is released.

5. The device according to claim 1, wherein said arms of each of said crosspieces are provided with reinforcement ribs at the side facing said plate and wherein threaded bores extend therethrough.

6. The device according to claim 1, wherein said clamping plates are massive structures and are each provided with an angle plate at one end thereof having an angular face, said outwardly-extending arm of said crosspieces being provided with an angular face defining a slot in which said angle plate engages.

7. The device according to claim 6, wherein each of said clamping plates is provided with a support bar which is mounted at the end away from said angle plate thereof so that a recess is provided between said support bar and said angle plate.

* * * * *